United States Patent
An et al.

(10) Patent No.: US 12,237,468 B2
(45) Date of Patent: Feb. 25, 2025

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Yu Ha An, Daejeon (KR); Hyun Seung Kim, Daejeon (KR); Chul Haeng Lee, Daejeon (KR); Jeong Woo Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 640 days.

(21) Appl. No.: 17/631,601

(22) PCT Filed: Sep. 9, 2020

(86) PCT No.: PCT/KR2020/012176
§ 371 (c)(1),
(2) Date: Jan. 31, 2022

(87) PCT Pub. No.: WO2021/049875
PCT Pub. Date: Mar. 18, 2021

(65) Prior Publication Data
US 2022/0376301 A1    Nov. 24, 2022

(30) Foreign Application Priority Data
Sep. 11, 2019    (KR) .................. 10-2019-0112754

(51) Int. Cl.
| | | |
|---|---|---|
| *H01M 10/0567* | (2010.01) | |
| *H01M 4/02* | (2006.01) | |
| *H01M 4/505* | (2010.01) | |
| *H01M 4/525* | (2010.01) | |
| *H01M 10/052* | (2010.01) | |

(52) U.S. Cl.
CPC ....... *H01M 10/0567* (2013.01); *H01M 4/505* (2013.01); *H01M 4/525* (2013.01); *H01M 10/052* (2013.01); *H01M 2004/028* (2013.01); *H01M 2300/0025* (2013.01)

(58) Field of Classification Search
None
See application file for complete search history.

(56) References Cited

U.S. PATENT DOCUMENTS

| | | |
|---|---|---|
| 5,276,066 A | 1/1994 | Paulik et al. |
| 2006/0189567 A1 | 8/2006 | Kanazashi et al. |
| 2013/0164604 A1 | 6/2013 | Matsumoto et al. |
| 2015/0140445 A1 | 5/2015 | Aoki et al. |
| 2016/0066579 A1 | 3/2016 | Porosa et al. |
| 2016/0218392 A1 | 7/2016 | Lee et al. |
| 2016/0374345 A1 | 12/2016 | Porosa et al. |
| 2017/0077551 A1 | 3/2017 | Kishi et al. |
| 2017/0125832 A1 | 5/2017 | Umeda et al. |
| 2018/0198163 A1 | 7/2018 | Sekine et al. |
| 2019/0116798 A1 | 4/2019 | Porosa et al. |
| 2019/0198924 A1 | 6/2019 | Kim et al. |
| 2019/0207258 A1 | 7/2019 | Kim et al. |

FOREIGN PATENT DOCUMENTS

| | | |
|---|---|---|
| CN | 105826604 A | 8/2016 |
| CN | 106232610 A | 12/2016 |
| CN | 108977840 A | 12/2018 |
| CN | 109651584 A | 4/2019 |
| JP | 2002280061 A | 9/2002 |
| JP | 2012248311 A | 12/2012 |
| JP | 2015015165 A | 1/2015 |
| JP | 2017059393 A | 3/2017 |
| JP | 6159602 B2 | 7/2017 |
| JP | 2019061835 A | 4/2019 |
| JP | 2019114391 A | 7/2019 |
| KR | 20100099994 A | 9/2010 |
| KR | 20150030721 A | 3/2015 |
| KR | 20160142289 A | 12/2016 |
| KR | 20180019913 A | 2/2018 |
| KR | 20180025917 A | 3/2018 |
| KR | 20180027999 A | 3/2018 |
| SU | 739076 A1 | 6/1980 |
| WO | 2012029420 A1 | 3/2012 |
| WO | 2012161305 A1 | 11/2012 |

OTHER PUBLICATIONS

S. Schmidt et al., "Ligand influence in Liion battery hybrid active materials: Ni methylenediphosphonate vs. Ni dimethylamino methylenediphosphonate", Chemical Communications, 2017, vol. 53, No. 39, 6 pgs.
International Search Report for PCT/KR2020/012176 dated Dec. 11, 2020. 3 pgs.
Extended European Search Report for Application No. 20863402.2 dated Jul. 20, 2022. 8 pgs.

*Primary Examiner* — Haroon S. Sheikh
*Assistant Examiner* — Taeyoung Son
(74) *Attorney, Agent, or Firm* — Lerner David LLP

(57) ABSTRACT

A non-aqueous electrolyte solution for a lithium secondary battery and a lithium secondary battery including the same are disclosed herein. In some embodiments, non-aqueous electrolyte solution includes a lithium salt, an organic solvent, and a compound represented by Formula 1 as a first additive. A lithium secondary battery including the non-aqueous electrolyte has improved flame retardancy.

10 Claims, No Drawings

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2020/012176, filed on Sep. 9, 2020, which claims priority from Korean Patent Application No. 10-2019-0112754, filed on Sep. 11, 2019, the disclosures of which are incorporated by reference herein.

TECHNICAL FIELD

The present invention relates to a non-aqueous electrolyte solution for a lithium secondary battery and a lithium secondary battery including the same.

BACKGROUND ART

Dependence on electrical energy is gradually increasing in modern society, and, accordingly, production of the electrical energy has been further increased. In order to address environmental issues that arise during this process, renewable energy generation is in the spotlight as a next-generation power generation system. With respect to renewable energy, since it exhibits intermittent power generation characteristics, a large-capacity power storage device is indispensable to supply power stably. A lithium-ion battery is in the spotlight as a device exhibiting the highest energy density which is currently commercialized among power storage devices.

The lithium-ion battery is composed of a positive electrode formed of a transition metal oxide containing lithium, a negative electrode capable of storing the lithium, an electrolyte solution that includes an organic solvent containing a lithium salt, and a separator.

With respect to the positive electrode among these components, energy is stored through a redox reaction of transition metal, wherein this results in the fact that the transition metal must be essentially included in a positive electrode material.

There is a limitation in that a specific positive electrode structure collapses during repeated charge and discharge to dissolve the transition metal, or the transition metal is dissolved in the electrolyte solution due to an acid formed by a side reaction of the electrolyte solution or hydrolysis/pyrolysis of the lithium salt at a high operating potential.

With respect to the dissolved transition metal, it is not only re-deposited on the positive electrode to increase resistance of the positive electrode, but it is also electrode-posited on the negative electrode through the electrolyte solution to self-discharge the negative electrode and destruct a solid electrolyte interphase (SEI) that gives passivation ability to the negative electrode, and, thus, it is known as a factor to increase interfacial resistance of the negative electrode while promoting an additional electrolyte solution decomposition reaction.

Since this series of reactions reduces an amount of available lithium ions in the battery, it becomes a major cause of the degradation of capacity of the battery. In addition, in a case in which metal ions electrodeposited on the negative electrode grow as dendrites, since it causes an internal short-circuit of the battery, this leads to a decrease in safety of the battery.

PRIOR ART DOCUMENT

Japanese Patent Application Laid-open Publication No. 2012-248311
Korean Patent Application Laid-open Publication No. 2018-0025917

DISCLOSURE OF THE INVENTION

Technical Problem

An aspect of the present invention provides a non-aqueous electrolyte solution for a lithium secondary battery which includes an additive forming a robust film on a surface of a positive electrode as well as having an excellent effect of scavenging a decomposition product generated from a lithium salt.

Another aspect of the present invention provides a lithium secondary battery in which high-temperature storage characteristics and high-temperature cycle characteristics are improved by including the non-aqueous electrolyte solution for a lithium secondary battery.

Technical Solution

According to an aspect of the present invention,
there is provided a non-aqueous electrolyte solution for a lithium secondary battery which includes a lithium salt, an organic solvent, and a first additive,
wherein the first additive includes a compound represented by Formula 1.

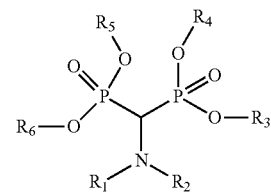

[Formula 1]

wherein, in Formula 1,
$R_1$ to $R_6$ are each independently hydrogen or a substituted or unsubstituted alkyl group having 1 to 10 carbon atoms.

According to another aspect of the present invention,
there is provided a lithium secondary battery including a negative electrode, a positive electrode, a separator disposed between the negative electrode and the positive electrode, and a non-aqueous electrolyte solution, wherein the non-aqueous electrolyte solution includes the non-aqueous electrolyte solution for a lithium secondary battery of the present invention.

Advantageous Effects

A compound represented by Formula 1, which is included in a non-aqueous electrolyte solution of the present invention, as a Lewis base-based compound containing a phosphite (PO3) group in its structure, may achieve a lithium secondary battery having improved high-temperature storage characteristics and cycle characteristics by suppressing dissolution of transition metal from a positive electrode by forming a robust film on the positive electrode during oxidation, and simultaneously scavenging a decomposition product caused by decomposition of anions of a lithium salt in the battery during charge and discharge.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Passivation ability of a solid electrolyte interphase (SEI) formed by decomposition of an electrolyte solution on a surface of positive/negative electrode is a major factor that greatly affects high-temperature storage performance. HF and $PF_5$, formed by pyrolysis of $LiPF_6$, a lithium salt widely used in a lithium ion battery, are known as one of factors that degrade a film. If the surface of the positive electrode is degraded by attack of the acid, transition metal dissolution occurs to increase surface resistance of the electrode due to a change in local structure of the surface, and capacity may be reduced. Also, transition metals constituting the positive electrode may be easily dissolved in the electrolyte solution due to structural variation of the positive electrode according to repeated charge and discharge, and the dissolved transition metal ions are re-deposited on the positive electrode to be a cause of increasing resistance of the positive electrode. In addition, since the transition metals moved to the negative electrode through the electrolyte solution are electrodeposited on the negative electrode to self-discharge the negative electrode and destruct a solid electrolyte interphase (SEI) that gives passivation ability to the negative electrode, interfacial resistance of the negative electrode is increased by promoting an additional electrolyte solution decomposition reaction. Since this series of reactions reduces an amount of available lithium ions in a battery, it not only leads to the degradation of capacity of the battery, but an electrolyte solution decomposition reaction is also accompanied, and thus, resistance is also increased.

The present invention aims at providing a non-aqueous electrolyte solution for a lithium secondary battery, which includes an additive capable of suppressing the dissolution of the transition metal by forming a robust film on the surface of the positive electrode as well as preventing the electrodeposition on the negative electrode or positive electrode by scavenging the dissolved metal ions, a cause of such degradation and failure behavior, in the battery, and a lithium secondary battery including the same.

Non-Aqueous Electrolyte Solution for Lithium Secondary Battery

Specifically, in an embodiment of the present invention, provided is a non-aqueous electrolyte solution for a lithium secondary battery which includes:

a lithium salt, an organic solvent, and a first additive, wherein the non-aqueous electrolyte solution for a lithium secondary battery includes a compound represented by Formula 1 as the first additive.

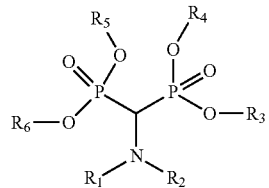

[Formula 1]

In Formula 1, $R_1$ to $R_6$ are each independently hydrogen or a substituted or unsubstituted alkyl group having 1 to 10 carbon atoms.

(1) Lithium Salt

First, in the non-aqueous electrolyte solution for a lithium secondary battery of the present invention, any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Ol^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_4^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$, and $SCN^-$ as an anion.

Specifically, the lithium salt may include a single material selected from the group consisting of LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, LiFSI (lithium bis(fluorosulfonyl)imide, $LiN(SO_2F)_2$), LiBETI (lithium bis(perfluoroethanesulfonyl)imide, $LiN(SO_2CF_2CF_3)_2$), and LiTFSI (lithium bis(trifluoromethanesulfonyl)imide, $LiN(SO_2CF_3)_2$), or a mixture of two or more thereof. In addition to them, any lithium salt commonly used in an electrolyte solution of a lithium secondary battery may be used without limitation.

The lithium salt may be appropriately changed in a normally usable range, but may be included in a concentration of 0.8 M to 4.0 M, for example, 1.0 M to 3.0 M in the electrolyte solution to obtain an optimum effect of forming a film for preventing corrosion of a surface of an electrode.

If the concentration of the lithium salt is less than 0.8 M, an effect of improving low-temperature output of the lithium secondary battery and improving cycle characteristics during high-temperature storage is insignificant, and, if the concentration of the lithium salt is greater than 4.0 M, impregnability of the electrolyte solution may be reduced due to an increase in viscosity of the non-aqueous electrolyte solution.

(2) Organic Solvent

In the non-aqueous electrolyte solution for a lithium secondary battery according to the present specification, the organic solvent may include a cyclic carbonate-based organic solvent, a linear carbonate-based organic solvent, or a mixed organic solvent thereof.

The cyclic carbonate-based organic solvent is an organic solvent which may well dissociate a lithium salt in an electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

The cyclic carbonate-based organic solvent and the linear carbonate-based organic solvent may be included in a volume ratio of 10:90 to 50:50, for example, 15:85 to 30:70, in order to secure high ionic conductivity.

Furthermore, the organic solvent may further include at least one ester-based organic solvent of a linear ester-based organic solvent and a cyclic ester-based organic solvent, which have lower melting point and higher stability at high temperature than the cyclic carbonate-based organic solvent and/or the linear carbonate-based organic solvent, to prepare an electrolyte solution having high ionic conductivity.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, σ-valerolactone, and ε-caprolactone.

The organic solvent may be used by adding an organic solvent typically used in an electrolyte solution for a lithium secondary battery without limitation, if necessary. For example, the organic solvent may further include at least one organic solvent selected from an ether-based organic solvent, an amide-based organic solvent, and a nitrile-based organic solvent.

(3) First Additive

The non-aqueous electrolyte solution for a lithium secondary battery of the present invention may include a compound represented by the following Formula 1 as a first additive.

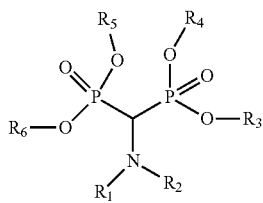

[Formula 1]

In Formula 1, $R_1$ to $R_6$ are each independently hydrogen or a substituted or unsubstituted alkyl group having 1 to 10 carbon atoms.

Specifically, in Formula 1, $R_1$ to $R_6$ may be each independently hydrogen or a substituted or unsubstituted alkyl group having 1 to 5 carbon atoms.

Also, in Formula 1, R1 and R2 may be each independently a substituted or unsubstituted alkyl group having 1 to 3 carbon atoms, and $R_3$ to $R_6$ may be each independently a substituted or unsubstituted alkyl group having 1 to 4 carbon atoms.

Furthermore, in Formula 1, R1 and R2 may be each independently an unsubstituted alkyl group having 1 or 2 carbon atoms, and $R_3$ to $R_6$ may be each independently an unsubstituted alkyl group having 1 to 3 carbon atoms.

Specifically, the compound represented by Formula 1 may be a compound represented by Formula 1a below.

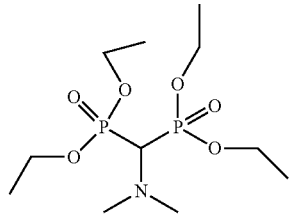

[Formula 1a]

Since the compound represented by Formula 1 may form a robust film on the positive electrode while a phosphite (P03) group and a lone electron pair of a $R_2N$ group contained in its structure are oxidized, it may improve high-temperature storage and cycle performance by suppressing the dissolution of the transition metal of the positive electrode and further mitigating the self-discharge of the secondary battery. Also, the compound represented by Formula 1 may act as a Lewis base to react with by-products causing degradation, for example, Lewis acids, such as HF and $PF_5$, decomposition products generated by decomposition of the lithium salt, and thus, the compound represented by Formula 1 may scavenge them. Therefore, since the compound represented by Formula 1 may suppress degradation behavior due to a chemical reaction of the surface film of the positive electrode or negative electrode caused by the Lewis acid, an additional decomposition of the electrolyte solution of the battery due to destruction of the film may be prevented.

The compound of Formula 1 may be included in an amount of 0.1 wt % to 5 wt o, for example, 0.1 wt % to 3 wt % based on a total weight of the non-aqueous electrolyte solution.

In a case in which the compound represented by Formula 1 is included in an amount within the above range, a secondary battery having more improved overall performance may be prepared. For example, if the amount of the compound represented by Formula 1 is less than 0.1 wt %, HF or $PF_5$ may be scavenged initially, but, since a scavenging effect is insignificant as time passes, a positive electrode protection effect may be reduced. Also, in a case in which the amount of the compound represented by Formula 1 is greater than 5.0 wt %, since a side reaction and a by-product due to the excessive amount of the additive may occur, resistance of the secondary battery may be increased during high-temperature storage.

Thus, when the compound represented by Formula 1 is included in an amount of 0.1 wt % to 5 wt %, for example, 0.1 wt % to 3 wt %, the compound represented by Formula 1 may form a robust film on the surface of the positive electrode and simultaneously may more effectively scavenge acids, such as HF and $PF_5$, the decomposition products of the lithium salt while suppressing disadvantages, such as the side reaction, the reduction in capacity, and the increase in resistance, caused by additives as much as possible.

(4) Second Additive

Also, in order to prevent the non-aqueous electrolyte solution from being decomposed to cause collapse of the negative electrode in a high output environment, or further improve low-temperature high-rate discharge characteristics, high-temperature stability, overcharge protection, and a battery swelling suppression effect at high temperatures, the non-aqueous electrolyte solution for a lithium secondary battery of the present invention may further include second additives in the non-aqueous electrolyte solution, if necessary.

Representative examples of the second additive may be at least one selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

The cyclic carbonate-based compound may include vinylene carbonate (VC) or vinyl ethylene carbonate.

The halogen-substituted carbonate-based compound may include fluoroethylene carbonate (FEC).

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound may include ethylene sulfate (Esa), trimethylene sulfate (TMS), or methyl trimethylene sulfate (MTMS).

The phosphate-based compound may include at least one compound selected from the group consisting of lithium difluoro bis(oxalato)phosphate, lithium difluorophosphate, tris(trimethylsilyl)phosphate, tris(trimethylsilyl)phosphite, tris(2,2,2-trifluoroethyl)phosphate, and tris(trifluoroethyl)phosphate.

The borate-based compound may include tetraphenylborate, lithium oxalyldifluoroborate (LiODFB), or lithium bis(oxalato)borate (LiBOB, $LiB(C_2O_4)_2$).

The nitrile-based compound may include at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound may include fluorobenzene, the amine-based compound may include triethanolamine or ethylenediamine, and the silane-based compound may include tetravinylsilane.

The lithium salt-based compound is a compound different from the lithium salt included in the non-aqueous electrolyte solution, wherein the lithium salt-based compound may include at least one compound selected from the group consisting of $LiPO_2F_2$ and $LiBF_4$.

In a case in which, among these second additives, vinylene carbonate, vinyl ethylene carbonate, or succinonitrile is included, a more robust SEI may be formed on the surface of the negative electrode during an initial activation process of the secondary battery. Also, in a case in which the $LiBF_4$ is included, high-temperature stability of the secondary battery may be improved by suppressing generation of a gas which may be generated due to the decomposition of the electrolyte solution at high temperatures.

The second additives may be used as a mixture of two or more thereof, and may be included in an amount of less than 50 wt %, particularly 0.01 wt % to 10 wt o, and preferably 0.05 wt % to 5 wt % based on the total weight of the non-aqueous electrolyte solution. If the amount of the second additive is less than 0.01 wt %, effects of improving low-temperature output, high-temperature storage characteristics, and high-temperature life characteristics of the battery are insignificant, and, if the amount of the second additive is 50 wt % or more, there is a possibility that the side reaction in the electrolyte solution occurs excessively during charge and discharge of the battery. Particularly, since the additives for forming an SEI may not be sufficiently decomposed at high temperatures when an excessive amount of the additives for forming an SEI is added, the additives for forming an SEI may be present in the form of an unreacted material or precipitates in the electrolyte solution at room temperature. Accordingly, a side reaction may occur in which life or resistance characteristics of the secondary battery are degraded.

Lithium Secondary Battery

Also, in another embodiment of the present invention, there is provided a lithium secondary battery including the non-aqueous electrolyte solution for a lithium secondary battery of the present invention.

The lithium secondary battery of the present invention may be prepared by forming an electrode assembly, in which a positive electrode, a negative electrode, and a separator disposed between the positive electrode and the negative electrode are sequentially stacked, accommodating the electrode assembly in a battery case, and then injecting the non-aqueous electrolyte solution of the present invention.

A typical method known in the art may be used as a method of preparing the lithium secondary battery of the present invention, and, specifically, the method of preparing the lithium secondary battery of the present invention is as described below.

(1) Positive Electrode

The positive electrode may be prepared by coating a positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal selected from the group consisting of nickel (Ni), cobalt (Co), manganese (Mn), iron (Fe), and aluminum (Al).

More specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$)), lithium-nickel-cobalt-based oxide (e.g., $LiNi_{1-Y1}Co_{Y1}O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$)), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), and any one thereof or two or more compounds thereof may be included. Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2}))_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$), or $Li(Ni_{0.8}Mn_{0.1}Co_{0.1}))_2$, and any one thereof or a mixture of two or more thereof may be used.

The positive electrode active material may be included in an amount of 80 wt % to 99 wt %, for example, 90 wt % to 99 wt % based on a total weight of solid content in the positive electrode slurry. In a case in which the amount of the positive electrode active material is 80 wt % or less, since energy density is reduced, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene termonomer, a styrene-butadiene rubber, a fluoro rubber, various copolymers thereof, and the like.

Also, the conductive agent is a material providing conductivity without causing adverse chemical changes in the battery, wherein it may be added in an amount of 1 wt % to 20 wt % based on the total weight of the solid content in the positive electrode slurry.

As a typical example of the conductive agent, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

Furthermore, the solvent may include an organic solvent, such as N-methyl-2-pyrrolidone (NMP), and may be used in an amount such that desirable viscosity is obtained when the positive electrode active material as well as option ally the binder and the conductive agent are included. For example, the solvent may be included in an amount such that a concentration of the solid content in the slurry including the positive electrode active material as well as optionally the binder and the conductive agent is in a range of 10 wt % to 60 wt o, for example, 20 wt % to 50 wt %.

(2) Negative Electrode

The negative electrode may be prepared by coating a negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0<x \leq 1$; $1 \leq y \leq 3$; $1 \leq z \leq 8$) may be used as the metal composite oxide.

The material, which may be doped and undoped with lithium, may include Si, $SiO_x$ ($0<x \leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$. and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene monomer, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content in the negative electrode slurry including the negative electrode active material as well as optionally the binder and the conductive agent is in a range of 50 wt % to 75 wt %, for example, 50 wt % to 65 wt %.

(3) Separator

A typical porous polymer film generally used, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator included in the lithium secondary battery of the present invention, and a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

Preparation of Non-aqueous Electrolyte Solution for Lithium Secondary Battery

A non-aqueous electrolyte solution for a lithium secondary battery was prepared by adding 0.5 g of the compound of Formula 1a to 99.5 g of a non-aqueous organic solvent, which was prepared by mixing ethylene carbonate (EC) and ethyl methyl carbonate (EMC) in a volume ratio of 30:70, and dissolving $LiPF_6$ such that a concentration of the $LiPF_6$ was 1.0 M (see Table 1 below).

Secondary Battery Preparation

A lithium nickel-cobalt-manganese oxide (Li($Ni_{0.8}Co_{0.1}Mn_{0.1}$)$O_2$) as positive electrode active material particles, carbon black as a conductive agent, and polyvinylidene fluoride, as a binder, were added to N-methyl-2-pyrrolidone (NMP), as a solvent, at a weight ratio of 97.5:1:1.5 to prepare a positive electrode slurry (solid content 85 wt %). A 15 μm thick positive electrode collector (Al thin film) was coated with the positive electrode slurry, dried, and roll-pressed to prepare a positive electrode.

A negative electrode active material (graphite:SiO=95:5 weight ratio), a binder (SBR-CMC), and a conductive agent (carbon black) were added to water, as a solvent, at a weight ratio of 95:3.5:1.5 to prepare a negative electrode slurry (solid content: 60 wt %). A 6 μm thick copper (Cu) thin film, as a negative electrode collector, was coated with the negative electrode slurry, dried, and roll-pressed to prepare a negative electrode.

After an electrode assembly was prepared by disposing a polypropylene porous separator between the above-prepared positive electrode and negative electrode, the electrode assembly was put in a battery case, and the above-prepared non-aqueous electrolyte solution was injected thereinto to prepare a lithium secondary battery.

Example 2

A lithium secondary battery was prepared in the same manner as in Example 1 except that a non-aqueous electrolyte solution for a lithium secondary battery was prepared by adding 5 g of the compound of Formula 1a to 95 g of a non-aqueous organic solvent and dissolving $LiPF_6$ such that a concentration of the $LiPF_6$ was 1.0 M.

Example 3

A lithium secondary battery was prepared in the same manner as in Example 1 except that a non-aqueous electrolyte solution for a lithium secondary battery was prepared by adding 0.1 g of the compound of Formula 1a to 99.9 g of a non-aqueous organic solvent and dissolving LiPF$_6$ such that a concentration of the LiPF$_6$ was 1.0 M.

Example 4

A lithium secondary battery was prepared in the same manner as in Example 1 except that a non-aqueous electrolyte solution for a lithium secondary battery was prepared by adding 8 g of the compound of Formula 1a to 92 g of a non-aqueous organic solvent and dissolving LiPF$_6$ such that a concentration of the LiPF$_6$ was 1.0 M.

Comparative Example 1

A lithium secondary battery was prepared in the same manner as in Example 1 except that a non-aqueous electrolyte solution for a lithium secondary battery was prepared by dissolving LiPF$_6$ in a non-aqueous organic solvent, in which ethylene carbonate (EC) and ethyl methyl carbonate (EMC) were mixed in a volume ratio of 30:70, such that a concentration of the LiPF$_6$ was 1.0 M.

Comparative Example 2

A lithium secondary battery was prepared in the same manner as in Example 1 except that a non-aqueous electrolyte solution for a lithium secondary battery was prepared by adding 3.0 g of vinylene carbonate, as an additive, to 97 g of a non-aqueous organic solvent and dissolving LiPF$_6$ such that a concentration of the LiPF$_6$ was 1.0 M.

under a CC condition. The above charging and discharging were set as one cycle, and 3 cycles of initial charging and discharging were performed.

Then, each of the initially charged and discharged lithium secondary batteries was charged at a rate of 0.33 C to 4.2 V under a CC-CV condition at a high temperature (45° C.) and discharged at a rate of 0.33 C to 2.5 V under a CC condition. The above charging and discharging were set as one cycle, and 200 cycles were performed.

Capacity after the first cycle and capacity after a 200$^{th}$ cycle were substituted into the following Equation 1 to calculate a capacity retention. The results thereof are presented in Table 2 below.

Capacity retention (%)=(discharge capacity after the 200$^{th}$ cycle/discharge capacity after the 1$^{st}$ cycle)×100    [Equation 1]

Experimental Example 2. High-temperature (45° C.) Cycle Characteristics Evaluation(2)

Each of the lithium secondary batteries prepared in Examples 1 to 4 and the secondary batteries prepared in Comparative Examples 1 and 2 was charged at a rate of 0.33 C to 4.2 V under a constant current-constant voltage (CC-CV) condition at 25° C. and discharged at a rate of 0.33 C to 2.5 V under a CC condition. The above charging and discharging were set as one cycle, and 3 cycles of initial charging and discharging were performed. An SOC (State Of Charge) was set to 50% based on 3$^{rd}$ discharge capacity of the above charging and discharging. Direct current internal resistance was calculated by a voltage drop obtained

TABLE 1

| Example | Lithium salt | Organic solvent (g) Composition | Organic solvent (g) Amount added (g) | First additive Formula | First additive Amount (g) | Second additive Type | Second additive Amount (g) |
|---|---|---|---|---|---|---|---|
| Example 1 | 1.0M | EC:EMC = | 99.5 | 1a | 0.5 | — | — |
| Example 2 | LiPF$_6$ | 30:70 | 95 | 1a | 5.0 | — | — |
| Example 3 | | | 99.9 | 1a | 0.1 | — | — |
| Example 4 | | | 92 | 1a | 8.0 | — | — |
| Comparative Example 1 | | | 100 | — | — | — | — |
| Comparative Example 2 | | | 97 | — | — | VC | 3.0 |

In Table 1, the abbreviation of each compound has the following meaning.

EC: ethylene carbonate
EMC: ethyl methyl carbonate
VC: vinylene carbonate

EXPERIMENTAL EXAMPLES

Experimental Example 1

High-Temperature (45° C.) Cycle Characteristics Evaluation(1)

After each of the lithium secondary batteries prepared in Examples 1 to 4 and the secondary batteries prepared in Comparative Examples 1 and 2 was subjected to a formation process at a rate of 0.1 C for 3 hours at 25° C., each secondary battery was charged at a rate of 0.33 C to 4.2 V under a constant current-constant voltage (CC-CV) condition at 25° C. and discharged at a rate of 0.33 C to 2.5 V when each lithium secondary battery was subjected to a discharge pulse at 2.5 C for 10 seconds at an SOC (State Of Charge) of 50%, and the resistance in this case was set as initial resistance.

Then, each of the initially charged and discharged lithium secondary batteries was charged at a rate of 0.33 C to 4.2 V under a CC-CV condition at a high temperature (45° C.) and discharged at a rate of 0.33 C to 2.5 V under a CC condition. After the above charging and discharging were set as one cycle and 200 cycles were performed, each lithium secondary battery was transferred to charge/discharge equipment at room temperature (25° C.) and direct current internal resistance was then calculated by a voltage drop obtained when each lithium secondary battery was subjected to a discharge pulse at 2.5 C for 10 seconds at an SOC (State Of Charge) of 50%.

The initial resistance and the resistance after the 200$^{th}$ cycle were substituted into the following Equation 2 to calculate a high-temperature cycle resistance increase rate. The results thereof are presented in Table 2 below.

Resistance increase rate (%)={(resistance after 200$^{th}$ cycle-initial resistance)/(initial resistance)}×100  [Equation 2]

TABLE 2

| Sample name | Capacity retention (%) | Resistance increase rate (%) |
|---|---|---|
| Example 1 | 82.37 | 41.10 |
| Example 2 | 82.24 | 41.20 |
| Example 3 | 81.10 | 42.20 |
| Example 4 | 79.75 | 49.35 |
| Comparative Example 1 | 77.59 | 57.92 |
| Comparative Example 2 | 77.92 | 52.10 |

Referring to Table 2, with respect to the lithium secondary batteries of Examples 1 to 3 including the non-aqueous electrolyte solution for a lithium secondary battery of the present invention, it may be understood that capacity retentions and resistance increase rates after 200 cycles at a high temperature were all improved in comparison to those of the lithium secondary battery of Comparative Example 1 including the non-aqueous electrolyte solution without using an additive and the lithium secondary battery of Comparative Example 2 including the non-aqueous electrolyte solution containing vinylene carbonate as an additive.

With respect to the lithium secondary battery of Example 4 including the non-aqueous electrolyte solution containing the excessive amount of the additive, it may be understood that the capacity retention was relatively decreased and the resistance increase rate was increased in comparison to those of the lithium secondary batteries of Examples 1 to 3.

Experimental Example 3

High-Temperature (60° C.) Storage Characteristics Evaluation(1)

Each of the lithium secondary batteries prepared in Examples 1 to 4 and the secondary batteries prepared in Comparative Examples 1 and 2 was charged at a rate of 0.33 C to 4.2 V under a constant current-constant voltage (CC-CV) condition at 25° C. and discharged at a rate of 0.33 C to 2.5 V under a CC condition. The above charging and discharging were set as one cycle, and 3 cycles of initial charging and discharging were performed. In this case, each of 3$^{rd}$ discharge capacities of the above charging and discharging was set as initial discharge capacity. Thereafter, each lithium secondary battery was charged at a rate of 0.33 C to 4.2 V under a constant current-constant voltage (CC-CV) condition and then stored at 60° C. for 12 weeks.

Then, after each lithium secondary battery was transferred to charge/discharge equipment at room temperature (25° C.), each lithium secondary battery was charged at a rate of 0.33 C to 4.2 V under a CC-CV condition and discharged at a rate of 0.33 C to 2.5 V under a CC condition. The 3$^{rd}$ discharge capacity of the above charging and discharging and the initial capacity were substituted into the following Equation 3 to calculate a high-temperature storage capacity retention. The results thereof are presented in Table 3 below.

Capacity retention (%)=(discharge capacity after 12 weeks high-temperature storage/initial discharge capacity)×100  [Equation 3]

Experimental Example 4

High-Temperature (60° C.) Storage Characteristics Evaluation(2)

Each of the lithium secondary batteries prepared in Examples 1 to 4 and the secondary batteries prepared in Comparative Examples 1 and 2 was charged at a rate of 0.33 C to 4.2 V under a constant current-constant voltage (CC-CV) condition at 25° C. and discharged at a rate of 0.33 C to 2.5 V under a CC condition. The above charging and discharging were set as one cycle, and 3 cycles of initial charging and discharging were performed. An SOC (State Of Charge) was set to 50% based on 3$^{rd}$ discharge capacity of the above charging and discharging. Direct current internal resistance was calculated by a voltage drop obtained when each lithium secondary battery was subjected to a discharge pulse at 2.5 C for 10 seconds at an SOC (State Of Charge) of 50%, and the resistance in this case was set as initial resistance. Thereafter, each lithium secondary battery was charged at a rate of 0.33 C to 4.2 V under a constant current-constant voltage (CC-CV) and then stored at 60° C. for 12 weeks.

Thereafter, after each lithium secondary battery was transferred to charge/discharge equipment at room temperature (25° C.), direct current internal resistance was calculated by a voltage drop obtained when each lithium secondary battery was subjected to a discharge pulse at 2.5 C for 10 seconds at an SOC (State Of Charge) of 50%.

The initial resistance and the high-temperature storage resistance were substituted into the following Equation 4 to calculate a high-temperature storage resistance increase rate. The results thereof are presented in Table 3 below.

Resistance increase rate (%)={(resistance after 12 weeks high-temperature storage-initial resistance)/initial resistance}×100  [Equation 4]

TABLE 3

| Sample name | Capacity retention (%) | Resistance increase rate (%) |
|---|---|---|
| Example 1 | 84.05 | 55.76 |
| Example 2 | 82.84 | 58.93 |
| Example 3 | 82.09 | 60.92 |
| Example 4 | 79.49 | 78.33 |
| Comparative Example 1 | 75.17 | 85.80 |
| Comparative Example 2 | 76.97 | 80.66 |

Referring to Table 3, with respect to the lithium secondary batteries of Examples 1 to 3 including the non-aqueous electrolyte solution for a lithium secondary battery of the present invention, it may be understood that capacity retentions and resistance increase rates after high-temperature storage were all improved in comparison to those of the lithium secondary battery of Comparative Example 1 including the non-aqueous electrolyte solution without using an additive and the lithium secondary battery of Comparative Example 2 including the non-aqueous electrolyte solution containing vinylene carbonate as an additive.

With respect to the lithium secondary battery of Example 4 including the non-aqueous electrolyte solution containing the excessive amount of the additive, it may be understood that the capacity retention was relatively decreased and the resistance increase rate was increased in comparison to those of the lithium secondary batteries of Examples 1 to 3.

The invention claimed is:

1. A non-aqueous electrolyte solution for a lithium secondary battery, the non-aqueous electrolyte solution comprising:

a lithium salt; an organic solvent; and a first additive,
wherein the first additive is a compound represented by Formula 1

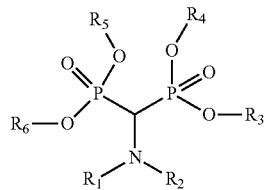

[Formula 1]

wherein, in Formula 1, $R_1$ to $R_6$ are each independently hydrogen or a substituted or unsubstituted alkyl group having 1 to 10 carbon atoms.

2. The non-aqueous electrolyte solution for a lithium secondary battery of claim 1, wherein, in Formula 1, $R_1$ to $R_6$ are each independently hydrogen or a substituted or unsubstituted alkyl group having 1 to 5 carbon atoms.

3. The non-aqueous electrolyte solution for a lithium secondary battery of claim 2, wherein, in Formula 1, $R_1$ and $R_2$ are each independently a substituted or unsubstituted alkyl group having 1 to 3 carbon atoms, and $R_3$ to $R_6$ are each independently a substituted or unsubstituted alkyl group having 1 to 4 carbon atoms.

4. The non-aqueous electrolyte solution for a lithium secondary battery of claim 3, wherein, in Formula 1, $R_1$ and $R_2$ are each independently an unsubstituted alkyl group having 1 or 2 carbon atoms, and $R_3$ to $R_6$ are each independently an unsubstituted alkyl group having 1 to 3 carbon atoms.

5. The non-aqueous electrolyte solution for a lithium secondary battery of claim 1, wherein the compound represented by Formula 1 comprises a compound represented by Formula 1a

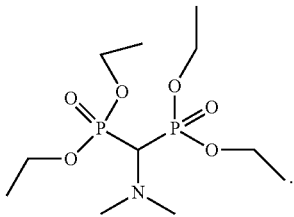

[Formula 1a]

6. The non-aqueous electrolyte solution for a lithium secondary battery of claim 1, wherein the compound represented by Formula 1 is present in an amount of 0.1 wt % to 5 wt % based on a total weight of the non-aqueous electrolyte solution.

7. The non-aqueous electrolyte solution for a lithium secondary battery of claim 6, wherein the compound represented by Formula 1 is present in an amount of 0.1 wt % to 3 wt % based on the total weight of the non-aqueous electrolyte solution.

8. The non-aqueous electrolyte solution for a lithium secondary battery of claim 1, further comprising at least one second additive selected from the group consisting of a cyclic carbonate-based compound, a halogen-substituted carbonate-based compound, a sultone-based compound, a sulfate-based compound, a phosphate-based compound, a borate-based compound, a nitrile-based compound, an amine-based compound, a silane-based compound, and a lithium salt-based compound.

9. A lithium secondary battery, comprising:
a negative electrode;
a positive electrode;
a separator disposed between the negative electrode and the positive electrode; and
the non-aqueous electrolyte solution of claim 1.

10. The lithium secondary battery of claim 9, wherein the positive electrode comprises:
a positive electrode active material including lithium and at least one metal selected from the group consisting of nickel (Ni), cobalt (Co), manganese (Mn), iron (Fe), and aluminum (Al).

* * * * *